US009685882B2

United States Patent
Kim et al.

(10) Patent No.: US 9,685,882 B2
(45) Date of Patent: Jun. 20, 2017

(54) APPARATUS AND METHOD FOR WIRELESS POWER RECEPTION

(71) Applicant: Samsung Electronics Co., Ltd., Suwon-si (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Bong Chul Kim, Seoul (KR); Yun Kwon Park, Dongducheon-si (KR); Jae Hyun Park, Yongin-si (KR); Keum Su Song, Seoul (KR); Chi Hyung Ahn, Suwon-si (KR); Young Ho Ryu, Yongin-si (KR); Byoung Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 14/454,932

(22) Filed: Aug. 8, 2014

(65) Prior Publication Data
US 2015/0042274 A1    Feb. 12, 2015

(30) Foreign Application Priority Data
Aug. 9, 2013    (KR) .................. 10-2013-0095009

(51) Int. Cl.
*H02J 7/00*    (2006.01)
*H02M 7/219*    (2006.01)
(Continued)

(52) U.S. Cl.
CPC .......... *H02M 7/219* (2013.01); *H02J 7/0072* (2013.01); *H02J 7/025* (2013.01); *H02J 7/06* (2013.01);
(Continued)

(58) Field of Classification Search
USPC ....... 320/104, 107, 108, 111, 124, 134, 162, 320/166, 149, 148, 163
See application file for complete search history.

(56) References Cited

U.S. PATENT DOCUMENTS

| 6,181,588 | B1 * | 1/2001 | Kates | H02M 7/219 363/126 |
| 6,373,790 | B1 * | 4/2002 | Fujisawa | H02M 7/219 320/134 |

(Continued)

FOREIGN PATENT DOCUMENTS

| EP | 1 067 667 A1 | 1/2001 |
| JP | 2010-154700 A | 7/2010 |

(Continued)

OTHER PUBLICATIONS

International Search Report issued on Nov. 18, 2014, in counterpart International Application No. PCT/KR2014/007251 (4 pages, in English).

(Continued)

*Primary Examiner* — Brian Ngo
(74) *Attorney, Agent, or Firm* — NSIP Law

(57) ABSTRACT

An apparatus and a method for wireless power reception include converting a received wireless power to a wireless power for charging using a synchronous rectifier and a direct current/direct current (DC/DC) converter having a structure providing a high efficiency and low heat generation even when a high charging current is supplied.

22 Claims, 13 Drawing Sheets

(51) Int. Cl.
*H02J 7/02* (2016.01)
*H02M 3/156* (2006.01)
*H02J 7/06* (2006.01)
*H02M 1/00* (2006.01)
*H02M 3/158* (2006.01)

(52) U.S. Cl.
CPC .......... *H02M 3/156* (2013.01); *H02J 7/0042* (2013.01); *H02J 2007/0059* (2013.01); *H02M 3/158* (2013.01); *H02M 2001/007* (2013.01); *H02M 2007/2195* (2013.01); *Y02B 40/90* (2013.01); *Y02B 70/1408* (2013.01)

(56) References Cited

U.S. PATENT DOCUMENTS

| | | | | |
|---|---|---|---|---|
| 6,768,617 | B2* | 7/2004 | Marr | H02H 9/046 361/111 |
| 7,561,404 | B2* | 7/2009 | Sells | H02J 7/0034 361/246 |
| 2009/0103341 | A1* | 4/2009 | Lee | H02J 7/022 363/124 |
| 2010/0148723 | A1 | 6/2010 | Cook et al. | |
| 2011/0199045 | A1 | 8/2011 | Hui et al. | |
| 2011/0227543 | A1* | 9/2011 | Ivanov | H02M 7/219 320/163 |
| 2011/0234157 | A1 | 9/2011 | Knight | |
| 2011/0278951 | A1* | 11/2011 | Kurihara | H02J 5/005 307/104 |
| 2012/0051109 | A1 | 3/2012 | Kim et al. | |
| 2012/0249059 | A1* | 10/2012 | Matsumae | H02M 3/337 320/107 |
| 2012/0268078 | A1* | 10/2012 | Kajouke | H02M 5/293 320/166 |
| 2013/0049703 | A1* | 2/2013 | Perisic | H01M 10/44 320/162 |
| 2013/0249472 | A1* | 9/2013 | Hsu | H02M 7/797 320/107 |
| 2014/0266069 | A1* | 9/2014 | Deboy | H02J 7/0052 320/149 |
| 2014/0354241 | A1* | 12/2014 | Perisic | B60L 11/005 320/148 |

FOREIGN PATENT DOCUMENTS

| | | |
|---|---|---|
| JP | 2010-252517 A | 11/2010 |
| WO | WO 2013/011906 A1 | 1/2013 |

OTHER PUBLICATIONS

Extended European Search Report issued on Apr. 5, 2017 in corresponding European Patent Application No. 14 833 830.4 (9 pages in English).

* cited by examiner

APPARATUS AND METHOD FOR WIRELESS POWER RECEPTION

CROSS-REFERENCE TO RELATED APPLICATIONS

This application claims the benefit under 35 USC 119(a) of Korean Patent Application No. 10-2013-0095009 filed on Aug. 9, 2013, in the Korean Intellectual Property Office, the entire disclosure of which is incorporated herein by reference for all purposes.

BACKGROUND

1. Field

The following description relates to a wireless power transmission (WPT) system, and more particularly, to an apparatus and a method for wireless power reception.

2. Description of Related Art

Wireless power is energy that is transmitted from a wireless power transmission (WPT) apparatus to a wireless power reception apparatus through magnetic coupling. The wireless power reception apparatus may operate or charge a battery using the received energy. Accordingly, a WPT and charging system includes a source device for wirelessly transmitting a power and a target device for wirelessly receiving the power. The source device may be referred to as a WPT apparatus. Also, the target device may be referred to as a wireless power reception apparatus.

WPT based on a resonance scheme provides a high degree of freedom in terms of positions of the source device and the target device.

The source device includes a source resonator, and the target device includes a target resonator. Magnetic coupling and resonant coupling occur between the source resonator and the target resonator. The source device and the target device may communicate with each other to transmit and receive control information and state information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a synchronous rectifier includes a first switching unit; a second switching unit; a third switching unit; and a fourth switching unit; wherein the synchronous rectifier is configured to receive an alternating current (AC) input power via a first input terminal and a second input terminal; in response to a voltage of the first input terminal being greater than a voltage of the second input terminal, the second switching unit and the third switching unit are closed, the first switching unit and the fourth switching unit are opened, and a current of the AC input power is supplied to an output terminal of the synchronous rectifier via the closed second switching unit and the closed third switching unit, and in response to the voltage of the second input terminal being greater than the voltage of the first input terminal, the first switching unit and the fourth switching unit are closed, the second switching unit and the third switching unit are opened, and a current of the AC input power is supplied to the output terminal via the closed first switching unit and the closed fourth switching unit.

A first terminal of the first switching unit may be connected to the first input terminal, and a second terminal of the first switching unit may be connected to a ground; a first terminal of the second switching unit may be connected to the second input terminal, and a second terminal of the second switching unit may be connected to the ground; a first terminal of the third switching unit may be connected to the output terminal, and a second terminal of the third switching unit may be connected to the first input terminal; and a first terminal of the fourth switching unit may be connected to the output terminal, and a second terminal of the fourth switching unit may be connected to the second input terminal.

The synchronous rectifier may further include a rectifier controller configured to control closing and opening of the first switching unit based on the voltage of the first input terminal and the voltage of the second input terminal, and control closing and opening of the second switching unit based on the voltage of the first input terminal and the voltage of the second input terminal.

The first switching unit, the second switching unit, the third switching unit, and the fourth switching unit may be fabricated by a process different from a process by which the rectifier controller is fabricated.

The rectifier controller may be further configured to control the first switching unit and the second switching unit to compensate for a delay of the first switching unit and the second switching unit with respect to the third switching unit and the fourth switching unit.

The first switching unit may be a first N channel metal-oxide-semiconductor field-effect transistor (MOSFET); the second switching unit may be a second N channel MOSFET; the third switching unit may be a first P channel MOSFET; and the fourth switching unit may be a second P channel MOSFET.

The first P channel MOSFET and the second P channel MOSFET may be cross-coupled.

The first switching unit, the second switching unit, the third switching unit, and the fourth switching unit may be respective discrete power transistors.

In another general aspect, an apparatus for supplying a power includes a synchronous rectifier configured to rectify an alternating current (AC) input power to generate a direct current (DC) power; and a DC/DC converter configured to convert a DC level of the DC power; wherein the synchronous rectifier includes a first switching unit; a second switching unit; a third switching unit; and a fourth switching unit; the synchronous rectifier may be further configured to receive the AC input power via a first input terminal of the synchronous rectifier and a second input terminal of the synchronous rectifier; in response to a voltage of the first input terminal being greater than a voltage of the second input terminal, the second switching unit and the third switching unit are closed, the first switching unit and the fourth switching unit are opened, and a current of the AC input power is supplied to a first output terminal of the synchronous rectifier via the closed second switching unit and the closed third switching unit; in response to the voltage of the second input terminal being greater than the voltage of the first input terminal, the first switching unit and the fourth switching unit are closed, the second switching unit and the third switching unit are opened, and a current of the AC input power is supplied to the first output terminal via the closed first switching unit and the closed fourth switching unit, and the first output terminal is connected to a third input terminal of the DC/DC converter.

The synchronous rectifier may further include a rectifier controller configured to control closing and opening of the first switching unit based on the voltage of the first input terminal and the voltage of the second input terminal, and control closing and opening of the second switching unit based on the voltage of the first input terminal and the voltage of the second input terminal.

The first switching unit, the second switching unit, the third switching unit, and the fourth switching unit may be fabricated by a process different from a process by which the rectifier controller is fabricated.

The rectifier controller may be further configured to control the first switching unit and the second switching unit to compensate for a delay of the first switching unit and the second switching unit with respect to the third switching unit and the fourth switching unit.

The first switching unit may be a first N channel metal-oxide-semiconductor field-effect transistor (MOSFET); the second switching unit may be a second N channel MOSFET; the third switching unit may be a first P channel MOSFET; and the fourth switching unit may be a second P channel MOSFET.

The first P channel MOSFET and the second P channel MOSFET may be cross-coupled.

The rectifier controller may be further configured to control closing and opening of the first N channel MOSFET and the second N channel MOSFET based on the voltage of the first input terminal and the voltage of the second input terminal.

The rectifier controller and the DC/DC converter may be fabricated on a single chip.

The first switching unit, the second switching unit, the third switching unit, and the fourth switching unit may be respective discrete power transistors.

The DC/DC converter may be a DC/DC buck converter.

The DC/DC converter may include a fifth switching unit connected between the third input terminal and a second output terminal of the DC/DC converter; a sixth switching unit connected between the second output terminal and a ground; and a DC/DC controller configured to convert the DC level of the rectified AC input power by closing and opening the fifth switching unit and the sixth switching unit in an alternating manner so that when one of the fifth switching unit and the sixth switching unit is closed, another one of the fifth switching unit and the sixth switching unit is open.

In another general aspect, a method of supplying a power includes rectifying, by a synchronous rectifier, an alternating current (AC) input power to generate a direct current (DC) power; and converting, by a DC/DC converter, a DC level of the DC power; wherein the synchronous rectifier includes a first switching unit; a second switching unit; a third switching unit; and a fourth switching unit; the rectifying includes receiving the AC input power via a first input terminal of the synchronous rectifier and a second input terminal of the synchronous rectifier; in response to a voltage of the first input terminal being greater than a voltage of the second input terminal, closing the second switching unit and the third switching unit, opening the first switching unit and the fourth switching unit, supplying a current of the AC input power to a first output terminal of the synchronous rectifier via the closed second switching unit and the closed third switching unit; in response to the voltage of the second input terminal being greater than the voltage of the first input terminal, closing the first switching unit and the fourth switching unit, opening the second switching unit and the third switching unit, and supplying a current of the AC input power is supplied to the first output terminal via the closed first switching unit and the closed fourth switching unit; and the first output terminal is connected to a third input terminal of the DC/DC converter.

In another general aspect, an apparatus for supplying a power includes a synchronous rectifier including a plurality of switching elements; and a rectifier controller configured to control the switching elements of the synchronous rectifier in an alternating manner to rectify an alternating current (AC) power to generate a direct current (DC) power; and a DC/DC converter including a plurality of switching elements; and a DC/DC controller configured to control the switching elements of the DC/DC converter in an alternating manner to adjust a DC level of the DC power generated by the synchronous rectifier and output the DC power having the adjusted DC level; wherein the rectifier controller and the DC/DC controller are fabricated together on a single chip; and the plurality of switching elements of the synchronous rectifier and the plurality of switching elements of the DC/DC converter are fabricated as discrete off-chip switching elements.

The DC/DC controller may be further configured to control the switching elements of the DC/DC converter in an alternating manner to pulse-width modulate the DC power to adjust the level of the DC power.

The apparatus may further include a resonator configured to receive wireless AC power and supply the received wireless AC power to the synchronous rectifier; and a charging circuit configured to charge a battery with the DC power having the converted DC level.

Other features and aspects will be apparent from the following detailed description, the drawings, and the claims.

DETAILED DESCRIPTION

Figure 1:
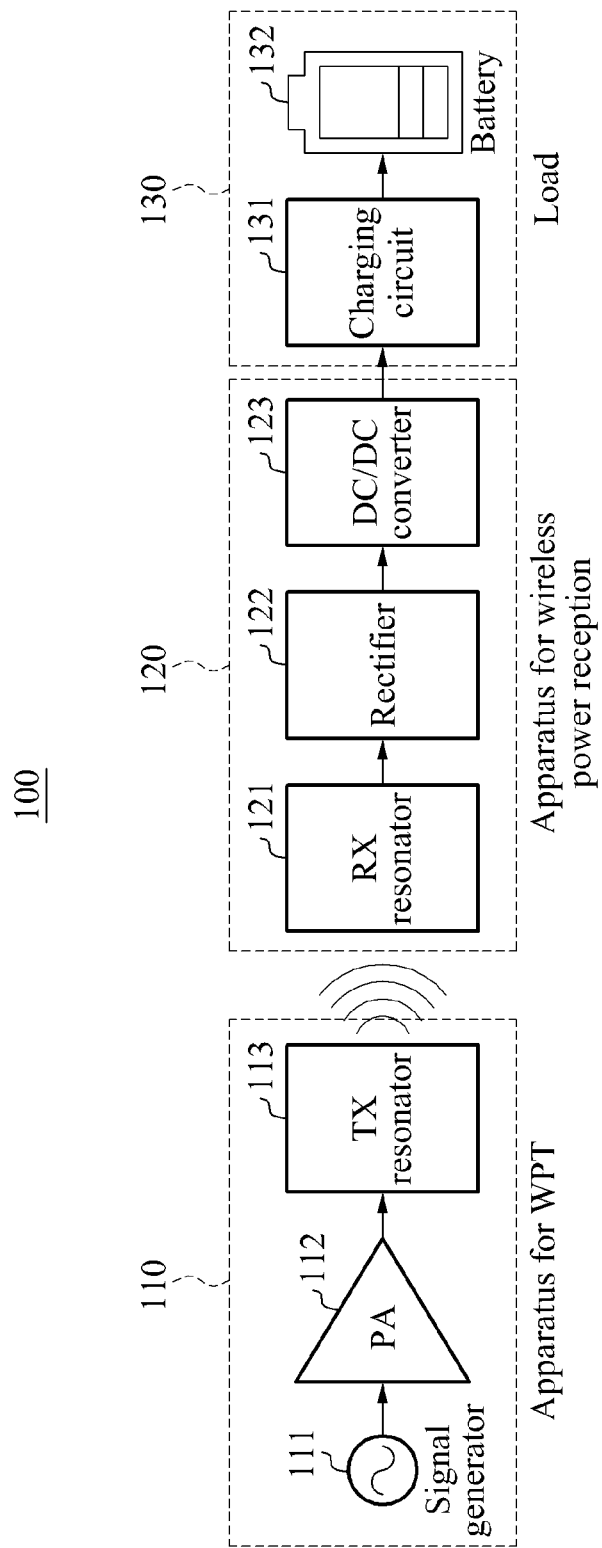
FIG. 1 illustrates an example of a wireless power transmission (WPT) system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a wireless power transmission (WPT) system 100.

The WPT system 100 includes a WPT apparatus 110, a wireless power reception apparatus 120, and a load 130.

The WPT apparatus 110 may be referred to as a transmitter (TX) element of the WPT system 100. The wireless power reception apparatus 120 may be referred to as a receiver (RX) element of the WPT system 100.

The load 130 charges a battery 132 using a charging circuit 131 with a power wirelessly received by the wireless power reception apparatus 120. The wireless power reception apparatus 120 and the load 130 may be part of a wireless device, such as a mobile device.

The WPT apparatus 110 includes a signal generator 111, a power amplifier (PA) 112, and a TX resonator 113.

The signal generator 111 generates a signal for wirelessly transmitting a power. The signal may have a predetermined frequency.

The signal may be an alternating current (AC) voltage having a frequency in a band of a tens of hertz (Hz).

The PA 112 generates an amplified signal by amplifying the signal generated by the signal generator 111.

The TX resonator 113 transmits the amplified signal to an RX resonator 121 of the wireless power reception apparatus 120 through resonance of the amplified signal. The TX resonator 113 may transmit the amplified signal to the RX resonator 121 of the wireless power reception apparatus 120 through magnetic resonance of the amplified signal.

The TX resonator 113 transmits the amplified signal to the RX resonator 121 as electromagnetic energy. In particular, the TX resonator 113 may transmit a communication power or a charging power to the wireless power reception apparatus 120 through magnetic coupling with the RX resonator 121.

The wireless power reception apparatus 120 includes the RX resonator 121, a rectifier 122, and a direct current/direct current (DC/DC) converter 123.

The RX resonator 121 generates a signal by receiving the power transmitted from the TX resonator 113 of the WPT apparatus 110. The generated signal is an AC voltage. The RX resonator 121 outputs the generated signal. In particular, an AC power or voltage is output from the RX resonator 121.

The RX resonator 121 receives the electromagnetic energy transmitted from the TX resonator 113. For example, the RX resonator 121 may receive a communication power or charging power from the WPT apparatus 110 through magnetic coupling with the TX resonator 113.

The rectifier 122 generates a rectified signal by rectifying a signal received by the RX resonator 121. The rectifier 122 outputs the rectified signal to the DC/DC converter 123. The rectifier 122 converts a transmitted AC voltage to a stable DC voltage.

The DC/DC converter 123 changes a voltage level of the rectified signal, and generates a charging power.

The DC/DC converter 123 may be a DC/DC buck converter. In general, a DC voltage level of the rectified signal output from the rectifier 122 may be higher than the voltage level required by the charging circuit 131 of the load 130. Accordingly, the DC/DC buck converter may be used to step down the rectified signal output from the rectifier 122.

The changed voltage level may be a voltage level required by the load 130 or the wireless power reception apparatus 120. The DC/DC converter 123 outputs the charging power to the load 130.

The charging circuit 131 adjusts a voltage level and a current level of the charging power based on a charging status of the battery 132 for a stable charging operation. The charging circuit 131 may set a constant charging current to correspond to a capacity of the battery 132, and supply a stable charging power to the battery 132 through the setting.

The battery 132 receives the charging power from the charging circuit 131, and stores a current of the charging power in the battery 132, thereby charging the battery 132.

Figure 2:
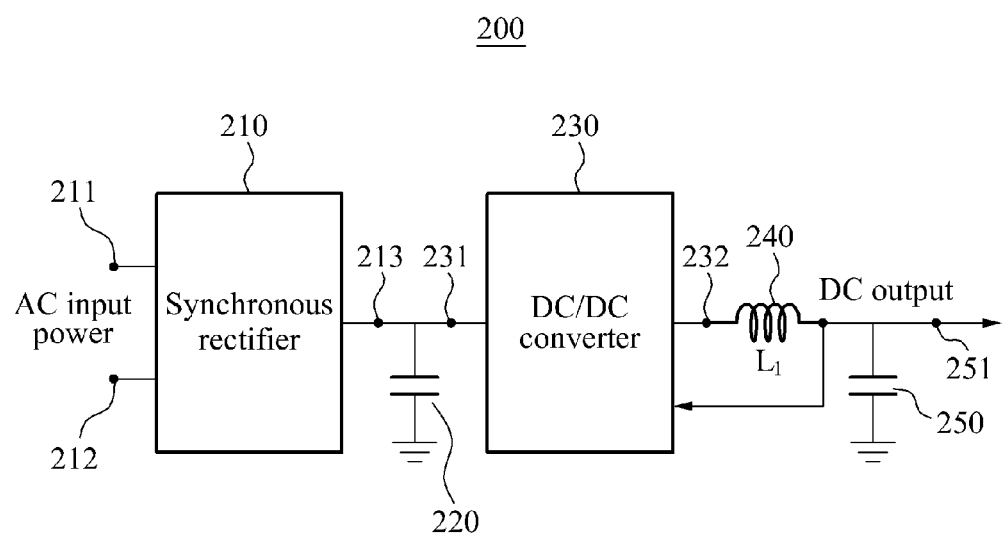
FIG. 2 illustrates an example of a structure of a power supplying apparatus.

FIG. 2 illustrates an example of a structure of a power supplying apparatus 200.

Referring to FIG. 2, the power supplying apparatus 200 corresponds to the wireless power reception apparatus 120 described with reference to FIG. 1.

The power supplying apparatus 200 includes a synchronous rectifier 210, a first capacitor 220, a DC/DC converter 230, a coil 240, and a second capacitor 250.

The synchronous rectifier 210 receives an AC input power via a first input terminal 211 and a second input terminal 212. In particular, the AC input power is supplied to the synchronous rectifier 210 via the first input terminal 211 and the second input terminal 212.

The AC input power may be a signal output from the RX resonator 121 in FIG. 1. The AC input power may also be a charging power received by the RX resonator 121.

The synchronous rectifier 210 rectifies the AC input power. Hereinafter, the rectified AC input power will be referred to as a "rectified power." The rectified power is output via a first output terminal 213 of the synchronous rectifier 210.

The synchronous rectifier 210 converts the AC input power into a DC power.

The first output terminal 213 of the synchronous rectifier 210 is connected to a third input terminal 231 of the DC/DC converter 230.

The first capacitor 220 is connected between the first output terminal 213 of the synchronous rectifier 210 and a ground. In this example, a first terminal of the first capacitor 220 is connected to the first output terminal 213 and a second terminal of the first capacitor 220 is connected to the ground.

The first capacitor 220 stores a current output from the first output terminal 213 of the synchronous rectifier 210. In particular, the first capacitor 220 stores a rectified power.

As described above, the AC input power is converted into the DC power by the synchronous rectifier 210 and the first capacitor 220. In particular, the synchronous rectifier 210 and the first capacitor 220 rectify the AC input power and generate the DC power.

The DC power is input to the DC/DC converter 230 via the third input terminal 231 of the DC/DC converter 230.

The DC/DC converter 230 converts a DC level of the DC power. A DC power appropriate for charging the load 130 may be generated by converting the DC level of the DC power.

The DC power having the converted DC level is output from the DC/DC converter 230 via a second output terminal 232 of the DC/DC converter 230.

The coil 240 is connected between the second output terminal 232 and a DC output terminal 251 of the DC/DC converter 230.

The second capacitor 250 is connected between the DC output terminal 251 and a ground.

Figure 3:
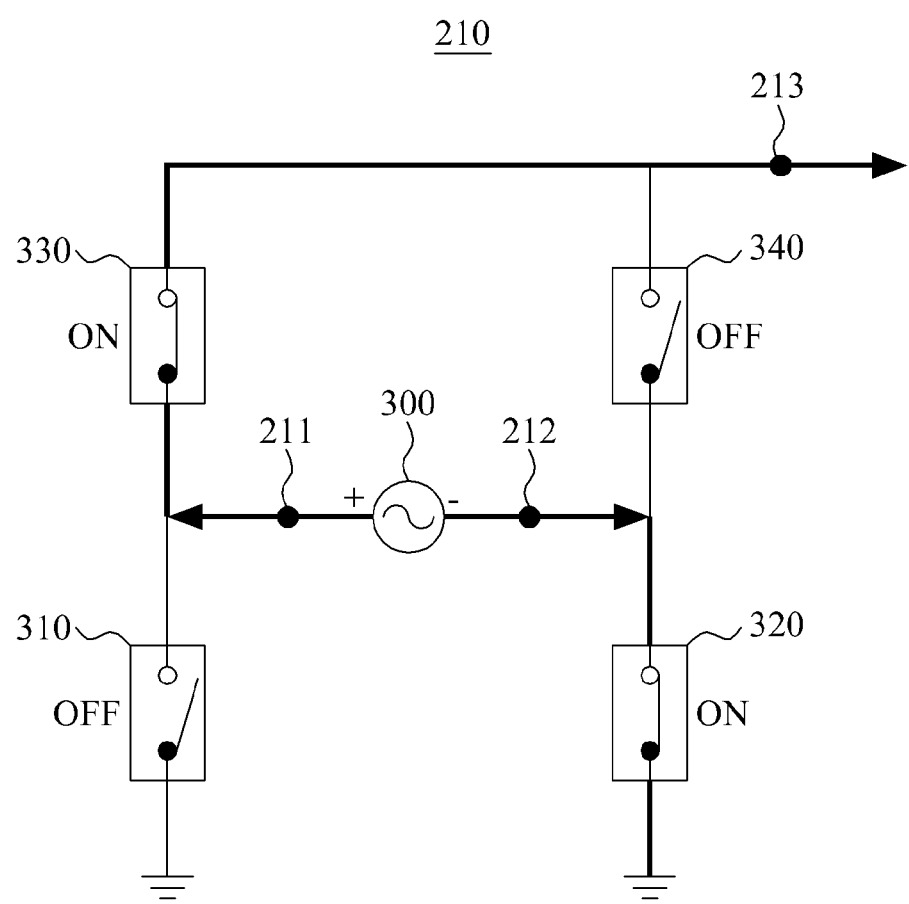
FIG. 3 illustrates an example of an operation of a synchronous rectifier.

FIG. 3 illustrates an example of an operation of the synchronous rectifier 210.

Referring to FIG. 3, the synchronous rectifier 210 includes a first switching unit 310, a second switching unit 320, a third switching unit 330, and a fourth switching unit 340.

A power supply 300 is an element for supplying an AC input power to the synchronous rectifier 210.

The first switching unit 310, the second switching unit 320, the third switching unit 330, and the fourth switching unit 340 may each be closed or opened. As used herein, "closed" refers to a state of a switching unit in which a current can flow through the switching unit, and "opened" refers to a state of the switching unit in which a current cannot flow through the switching unit.

The first switching unit 310, the second switching unit 320, the third switching unit 330, and the fourth switching unit 340 each have a first terminal and a second terminal. In this example, referring to FIG. 3, the first terminal is an upper terminal, and the second terminal is a lower terminal.

The first terminal of the first switching unit 310 is connected to the first input terminal 211, and the second terminal of the first switching unit 310 is connected to a ground.

The first terminal of the second switching unit 320 is connected to the second input terminal 212, and the second terminal of the second switching unit 320 is connected to the ground.

The first terminal of the third switching unit 330 is connected to the first output terminal 213, and the second terminal of the third switching unit 330 is connected to the first input terminal 211.

The first terminal of the fourth switching unit 340 is connected to the first output terminal 213, and the second terminal of the fourth switching unit 340 is connected to the second input terminal 212.

The AC input power is input to the synchronous rectifier 210 as a differential signal via the first input terminal 211 and the second input terminal 212.

Referring to FIG. 3, a voltage of the first input end 211 is positive, and a voltage of the second input end 212 is negative.

When the voltage of the first input terminal 211 is greater than the voltage of the second input terminal 212, the second switching unit 320 and the third switching unit 330 are closed, and the first switching unit 310 and the fourth switching unit 340 are opened, thereby supplying a current of the AC input power to the first output terminal 213 via the closed second switching unit 320 and the closed third switching unit 330. In particular, a voltage of the AC input power is applied to the first output terminal 213. The voltage of the AC input power is a difference between the voltage of the first input terminal 211 and the voltage of the second input terminal 212.

Figure 4:
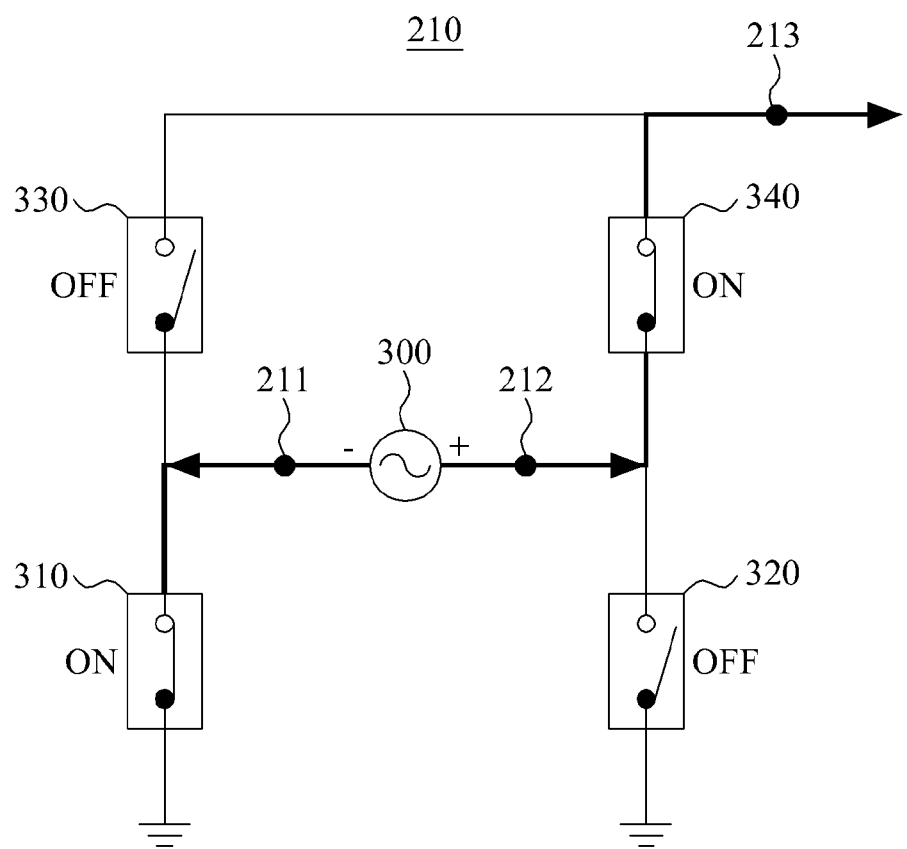
FIG. 4 illustrates another example of an operation of a synchronous rectifier.

FIG. 4 illustrates another example of an operation of the synchronous rectifier 210.

Referring to FIG. 4, the voltage of the first input terminal 211 is negative, and the voltage of the second input terminal 212 is positive.

When the voltage of the second input terminal 212 is greater than the voltage of the first input terminal 211, the first switching unit 310 and the fourth switching unit 340 are closed, and the second switching unit 320 and the third switching unit 330 are opened, thereby supplying a current of an AC input power to the first output terminal 213 via the closed first switching unit 310 and the closed fourth switching unit 340. In particular, a voltage of the AC input power is applied to the first output terminal 213. The voltage of the AC input power is a difference between the voltage of the second input terminal 212 and the voltage of the first input terminal 211.

The voltage applied to the first output terminal 213 may be greater than zero at all times through operations of the switching units described with reference to FIGS. 3 and 4.

Figure 5:
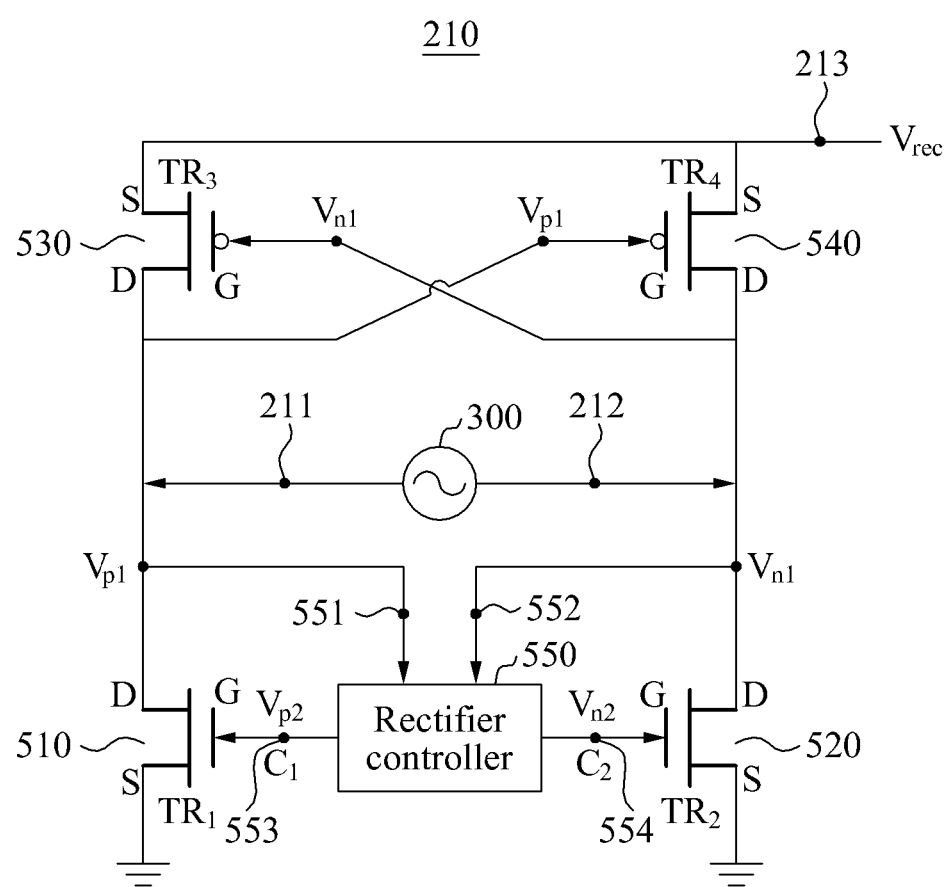
FIG. 5 illustrates an example of a structure of a synchronous rectifier.

FIG. 5 illustrates an example of a structure of the synchronous rectifier 210.

Referring to FIG. 5, the synchronous rectifier 210 includes a first N channel metal-oxide-semiconductor field-effect transistor (MOSFET) 510, a second N channel MOSFET 520, a first P channel MOSFET 530, a second P channel MOSFET 540, and a rectifier controller 550. In FIG. 5, the first N channel MOSFET 510, the second N channel MOSFET 520, the first P channel MOSFET 530, and the second P channel MOSFET 540 are denoted by $TR_1$, $TR_2$, $TR_3$, and $TR_4$, respectively.

Also, although not illustrated in FIG. 5, the synchronous rectifier 210 may further include the first capacitor 220 described with reference to FIG. 2.

The first switching unit 310 described with reference to FIGS. 3 and 4 corresponds to the first N channel MOSFET 510. The second switching unit 320 corresponds to the second N channel MOSFET 520. The third switching unit 320 corresponds to the first P channel MOSFET 530. The fourth switching unit 340 corresponds to the second P channel MOSFET 540.

The first N channel MOSFET 510, the second N channel MOSFET 520, the first P channel MOSFET 530, and the second P channel MOSFET 540 may be fabricated by a process separate from a process used to fabricate the rectifier controller 550. In particular, the first switching unit 310, the second switching unit 320, the third switching unit 330, and the fourth switching unit 340 may be fabricated by the process separate from the process used to fabricate the rectifier controller 550.

The first N channel MOSFET 510, the second N channel MOSFET 520, the first P channel MOSFET 530, and the second P channel MOSFET 540 may be respective discrete power transistors configured by a plurality of off-chip discrete elements. In particular, the first switching unit 310, the second switching unit 320, the third switching unit 330, and the fourth switching unit 340 may be respective discrete power transistors. The discrete power transistors may be fabricated by a special process in which only a power transistor is fabricated.

The discrete power transistors, for example, the first N channel MOSFET 510, the second N channel MOSFET 520, the first P channel MOSFET 530, and the second P channel MOSFET 540, may be more efficient in terms of a cost and a function of operation than a transistor fabricated by an on-chip integrated process.

The first N channel MOSFET 510, the second N channel MOSFET 520, the first P channel MOSFET 530, and the second P channel MOSFET 540 each include at least one MOSFET. In particular, the first N channel MOSFET 510 and the second N channel MOSFET 520 may each include a single N channel MOSFET or a plurality of N channel MOSFETs, and the first P channel MOSFET 530 and the second P channel MOSFET 540 may each include a single P channel MOSFET or a plurality of P channel MOSFETs.

The first N channel MOSFET 510 and the second N channel MOSFET 520 may be closed or opened based on a signal applied to a gate terminal. For example, when a positive voltage is applied to a gate terminal of an N channel MOSFET, a source terminal of the N channel MOSFET and a drain terminal of the N channel MOSFET are connected together, and when a negative voltage is authorized into the gate terminal, a connection between the source terminal and the drain terminal is opened.

The first P channel MOSFET 530 and the second P channel MOSFET 540 are closed or opened based on the signal applied to the gate terminal. For example, when a negative voltage is applied to a gate terminal of a P channel MOSFET, a source terminal of the P channel MOSFET and a drain terminal of the P channel MOSFET are connected together, and when a positive voltage is applied to the gate terminal, a connection between the source terminal and the drain terminal is opened.

In the example in FIG. 5, the first P channel MOSFET 530 and the second P channel MOSFET 540 are cross-coupled. That is, the gate terminal of the first P channel MOSFET 530 is connected to the drain terminal of the second P channel MOSFET 540, and the gate terminal of the second P channel MOSFET 540 is connected to the drain terminal of the first P channel MOSFET 530.

A voltage $V_{p2}$ of a signal $C_1$ output from a third output terminal 553 of the rectifier controller 550 is applied to a gate terminal of the first N channel MOSFET 510. The drain terminal of the first N channel MOSFET 510 is connected to the first input terminal 211. The source terminal of the first N channel MOSFET 510 is connected to a ground.

A voltage $V_{n2}$ of a signal $C_2$ output from a fourth output terminal 554 of the rectifier controller 550 is applied to the gate terminal of the second N channel MOSFET 520. The drain terminal of the second N channel MOSFET 520 is connected to the second input terminal 212. The source terminal of the second N channel MOSFET 520 is connected to the ground.

A voltage $V_{n1}$ of the second input terminal 212 is applied to the gate terminal of the first P channel MOSFET 530. The source terminal of the first P channel MOSFET 530 is connected to the first output terminal 213. $V_{rec}$ denotes a voltage output from the first output terminal 213. The drain terminal of the first P channel MOSFET 530 is connected to the first input terminal 211.

A voltage $V_{p1}$ of the first input terminal 211 is applied to the gate terminal of the second P channel MOSFET 540. The source terminal of the first P channel MOSFET 530 is connected to the first output terminal 213. The drain terminal of the second P channel MOSFET 540 is connected to the second input terminal 212.

A fourth input terminal 551 of the rectifier controller 550 is connected to the first input terminal 211. The voltage $V_{p1}$ of the first input terminal 211 is applied to the fourth input terminal 551 of the rectifier controller 550. A fifth input terminal 552 of the rectifier controller 550 is connected to the second input terminal 212. The voltage $V_{n1}$ of the second input terminal 212 is applied to the fifth input terminal 552.

The third output terminal 553 of the rectifier controller 550 is connected to the gate terminal of the first N channel MOSFET 510. The third output terminal 553 of the rectifier controller 550 outputs the signal $C_1$ for controlling the first N channel MOSFET 510.

The fourth output terminal 554 of the rectifier controller 550 is connected to the gate terminal of the second N channel MOSFET 520. The fourth output terminal 554 of the rectifier controller 550 outputs the signal $C_2$ for controlling the second N channel MOSFET 520.

The rectifier controller 550 controls closing and opening of the first switching unit 310 or the first N channel MOSFET 510 based on the voltage $V_{p1}$ of the first input terminal 211 applied to the fourth input terminal 551 and the voltage $V_{n1}$ of the second input terminal 212 applied to the fifth input terminal 552. The rectifier controller 550 controls the signal $C_1$ output from the third output terminal 553 to control the closing and the opening of the first switching unit 310 or the first N channel MOSFET 510.

Also, the rectifier controller 550 controls closing and opening of the second switching unit 320 or the second N channel MOSFET 520 based on the voltage $V_{p1}$ of the first input terminal 211 applied to the fourth input terminal 551 and the voltage $V_{n1}$ of the second input terminal 212 applied to the fifth input terminal 552. The rectifier controller 550 controls the signal $C_2$ output from the fourth output terminal 554 to control the closing and the opening of the second switching unit 320 or the second N channel MOSFET 520.

Figure 6:
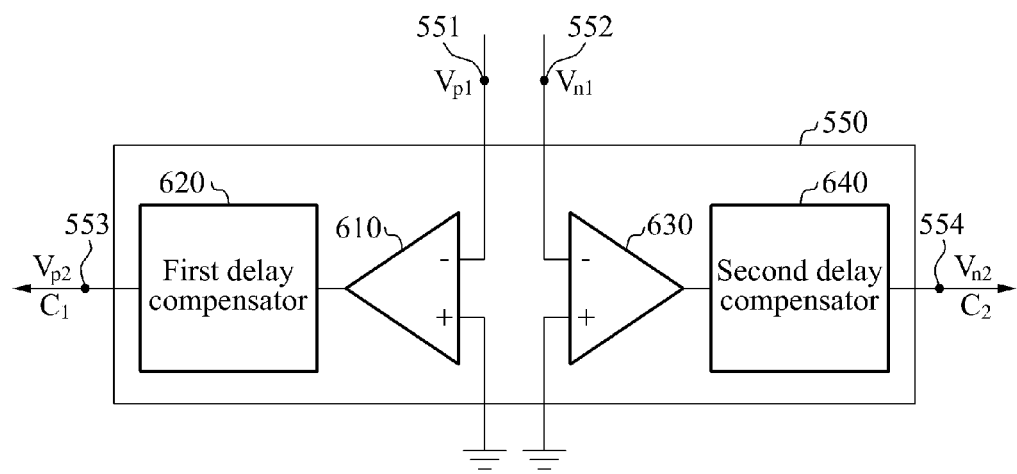
FIG. 6 illustrates an example of a structure of a rectifier controller.

FIG. 6 illustrates an example of a structure of the rectifier controller 550.

Referring to FIG. 6, the rectifier controller 550 includes a first comparator 610, a first delay compensator 620, a second comparator 630, and a second delay compensator 640. The first comparator 610 and the second comparator 630 may be high speed comparators, respectively.

The rectifier controller 550 may further include a buffer (not shown) for storing a signal output from the first comparator 610, the first delay compensator 620, the second comparator 630, or the second delay compensator 640 for a predetermined period of time.

A negative terminal of the first comparator 610 is connected to the fourth input terminal 551. The voltage $V_{p1}$ of the fourth input terminal 551 is applied to the negative terminal of the first comparator 610. A positive terminal of the first comparator 610 is connected to a ground.

The first comparator 610 outputs a control signal for closing or opening the first switching unit 310 based on the voltage applied to the negative terminal of the comparator 610. For example, when a voltage less than 0 volts (V) is applied to the negative terminal of the first comparator 610, the first comparator 610 outputs a control signal having a voltage for closing the first switching unit 310. When a voltage greater than 0 V is applied to the negative terminal of the first comparator 610, the first comparator 610 outputs a control signal having a voltage for opening the first switching unit 310. The control signal output from the first comparator 610 is input to the first delay compensator 620.

The first delay compensator 620 performs a delay compensation with respect to the control signal output from the first comparator 610. A delay may occur due to the operation of the first comparator 610 in which the voltage $V_{p1}$ applied to the fourth input terminal 551 is reflected in the controlling of the first switching unit 310.

The first delay compensator 620 may delay or advance the control signal output from the first comparator 610 for a predetermined period of time to compensate for the delay.

The first delay compensator 620 prevents a malfunction occurring due to the delay. For one example, the first delay compensator 620 may convert a portion of the control signal having the voltage for closing the first switching unit 310 output from the first comparator 610 to a voltage for opening the first switching unit 310 so that the first switching unit 310 and the third switching unit 330 are not closed simultaneously. In this example, the portion of the control signal that is converted corresponds to a period of time during which the third switching unit 330 is closed.

The control signal delayed, advanced, or converted by the first delay compensator 620 is output from the third output terminal 553. $C_1$ denotes the control signal output by the first delay compensator 620. $V_{p2}$ denotes a voltage of $C_1$.

A negative terminal of the second comparator 630 is connected to the fifth input terminal 552. A voltage $V_{n1}$ of the fourth input terminal 551 is applied to the negative terminal of the second comparator 630. A positive terminal of the second comparator 630 is connected to the ground.

The second comparator 630 outputs a control signal for closing or opening the second switching unit 320 based on the voltage applied to the negative terminal of the second comparator 630. For example, when a voltage less than 0 V is applied to the negative terminal of the second comparator 630, the second comparator 630 outputs a control signal having voltage for closing the second switching unit 320. When a voltage greater than 0 V is applied to the negative terminal of the second comparator 630, the second comparator 630 outputs a control signal having voltage for opening the second switching unit 320. The control signal output from the second comparator 630 is input to the second delay compensator 640.

The second delay compensator 640 performs a delay compensation with respect to the control signal output from the second comparator 630. A delay may occur due to the operation of the second comparator 630 in which the voltage $V_{n1}$ applied to the fifth input terminal 552 is reflected in the controlling of the second switching unit 320.

The second delay compensator 640 may delay or advance the control signal output from the second comparator 630 by a predetermined period of time to compensate for the delay.

The second delay compensator 640 prevents a malfunction occurring due to the delay. For one example, the second delay compensator 640 may convert a portion of the control signal having the voltage for closing the second switching unit 320 output from the second comparator 630 to a voltage for opening the first switching unit 310 so that the second switching unit 320 and the fourth switching unit 340 are not closed simultaneously. In this example, the portion of the control signal that is converted corresponds to a period of time during which the fourth switching unit 340 is closed.

The control signal delayed, advanced, or converted by the second delay compensator 640 is output from the fourth output terminal 554. $C_2$ denotes the control signal output by the second delay compensator 640. $V_{n2}$ denotes a voltage of $C_2$.

As described above, the synchronous rectifier 210 may compensate for the delay of the first switching unit 310 and the second switching unit 320 with respect to the third switching unit 330 and the fourth switching unit 340 in controlling the first switching unit 310 and the second switching unit 320 via the rectifier controller 550.

Figure 7A:
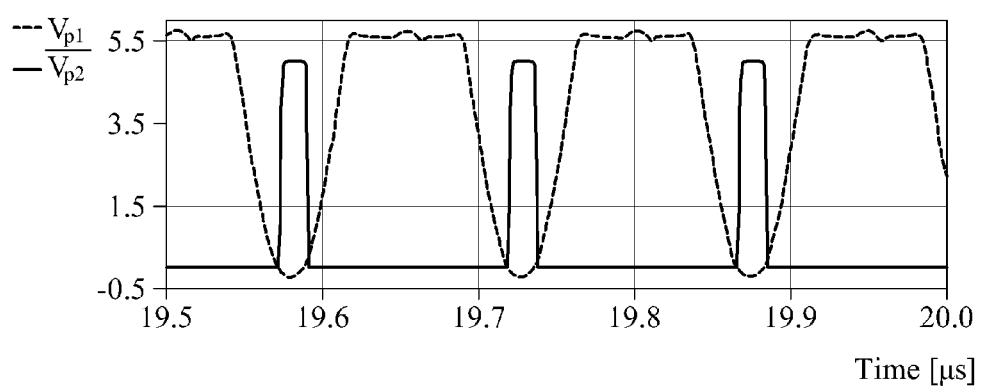
FIGS. 7A through 7C illustrate examples of input and output signal waveforms of a synchronous rectifier.
Figure 7B:
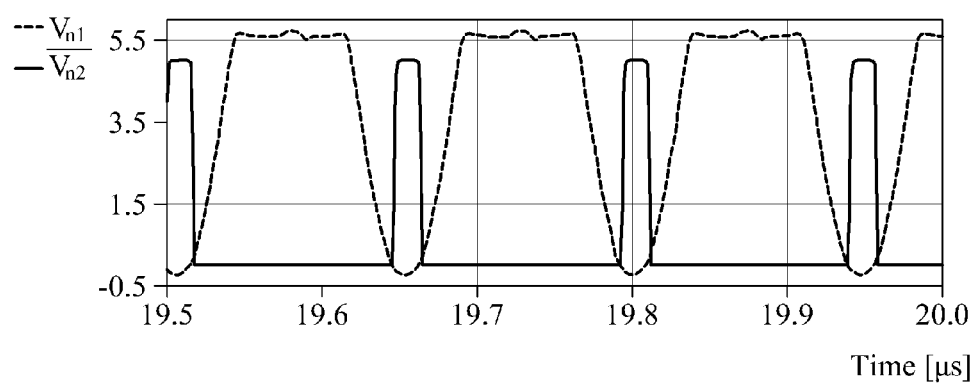
Figure 7C:
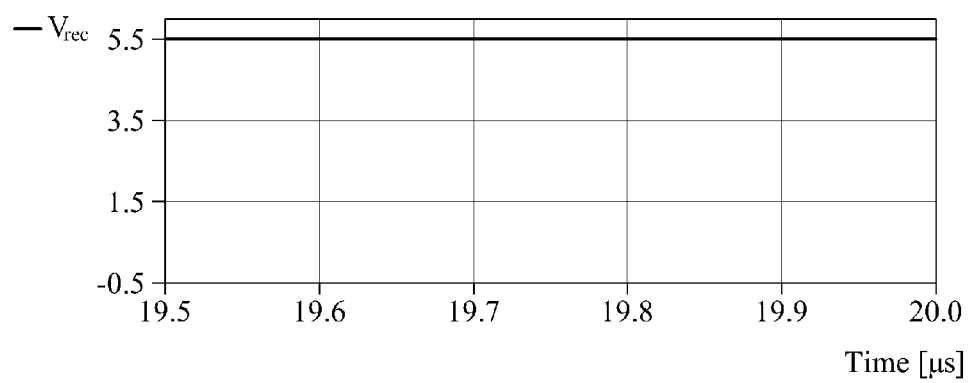

FIGS. 7A through 7C illustrate examples of an input and output signal waveforms of a synchronous rectifier.

In particular, FIGS. 7A through 7C illustrate voltage values of $V_{p1}$, $V_{p2}$, $V_{n1}$, $V_{n2}$, and $V_{rec}$ with respect to elapsed time.

$V_{p1}$, $V_{p2}$, $V_{n1}$, and $V_{n2}$ denote the voltages applied to the gate terminal of the second P channel MOSFET 540, the gate terminal of the first N channel MOSFET 510, the gate terminal of the first P channel MOSFET 530, and the gate terminal of the second N channel MOSFET 520, respectively.

$V_{rec}$ denotes the voltage output from the first output terminal 213.

The x axis of the graphs in FIGS. 7A through 7C is a time axis. The y axis of the graphs is a voltage value.

$V_{n1}$ has low value when $V_{p1}$ has a high value and vice versa because an AC input power is input to the synchronous rectifier 210 in a form of a differential signal via the first input terminal 211 and the second input terminal 212. In this instance, the first P channel MOSFET 530, for example, a P-channel MOSFET (PMOS), closed by $V_{n1}$ having the low value, and the second P channel MOSFET 540, for example, a PMOS, is opened by $V_{p1}$ having the high value.

Also, $V_{p1}$ and $V_{n1}$ are inverted to obtain $V_{p2}$ and $V_{n2}$ by the first comparator 610 and the second comparator 630, respectively. Thus, $V_{p2}$ has a low value when $V_{p1}$ has the high value and vice versa, and $V_{n2}$ has a high value when $V_{n1}$ has the low value and vice versa. $V_{p2}$ having the low value opens the first N channel MOSFET 510, for example, an N-channel MOSFET (NMOS), and $V_{n2}$ having the high value closes the second N channel MOSFET 520, for example, an NMOS.

Through the aforementioned operations, a current flowing through the closed second N channel MOSFET 520 and the closed first P channel MOSFET 530 charges the first capacitor 220 during a positive section of the AC input voltage. Also, a current flowing through the closed first N channel MOSFET 510 and the closed second P channel MOSFET 540 charges the first capacitor 220 during a negative section of the AC input voltage. Through such charging, the synchronous rectifier 210 operates as a full-wave rectifier, and generates a DC voltage $V_{rec}$.

Figure 8:
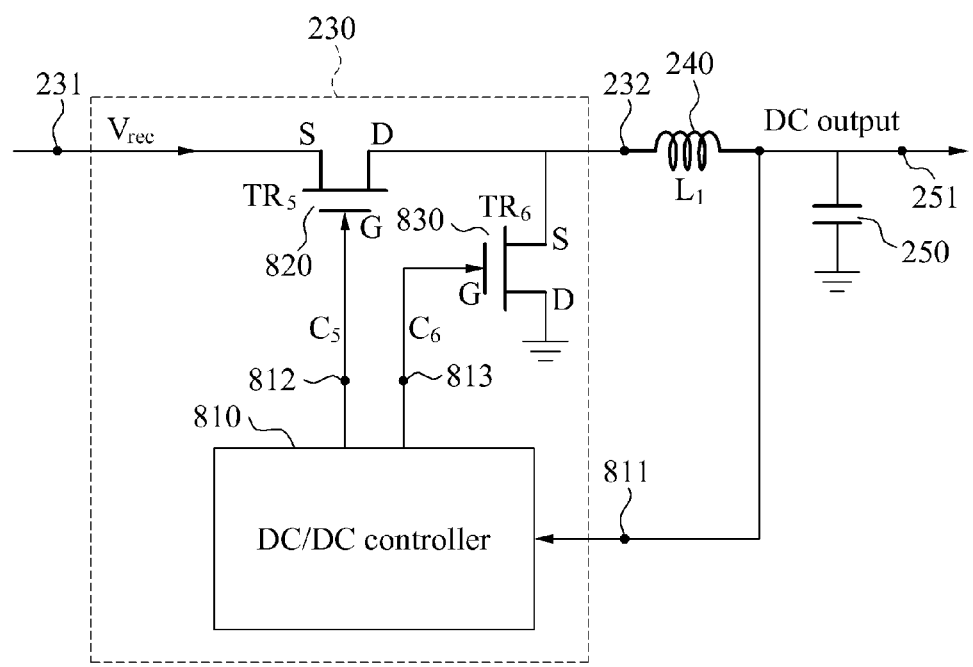
FIG. 8 illustrates an example of a structure of a direct current/direct current (DC/DC) converter.

FIG. 8 illustrates an example of a structure of a DC/DC converter 230.

Referring to FIG. 8, the DC/DC converter 230 includes a DC/DC controller 810, a fifth switching unit 820, and a sixth switching unit 830. The fifth switching unit 820 and the sixth switching unit 830 may be a third N channel MOSFET and a fourth N channel MOSFET, respectively. In FIG. 8, the fifth switching unit 820, for example, the third N channel MOSFET, and the sixth switching unit 830, for example, the fourth N channel MOSFET, are denoted by $TR_5$ and $TR_6$, respectively.

The third N channel MOSFET and the fourth N channel MOSFET may each include at least one MOSFET. The third N channel MOSFET and the fourth N channel MOSFET may be respective discrete power transistors configured by off-chip discrete elements. In particular, the fifth switching unit 820 and the sixth switching unit 830 may be the discrete power transistors, respectively. The third N channel MOSFET and the fourth N channel MOSFET, for example, the discrete power transistors, may be more efficient in terms of a cost and a function of operation than a transistor fabricated using an on-chip integrated process.

Also, the DC/DC converter 230 includes the coil 240 and the second capacitor 250 described with reference to FIG. 2. The coil 240 is denoted by $L_1$ in FIG. 8.

The fifth switching unit 820 is connected between the third input terminal 231 and the second output terminal 232. The sixth switching unit 830 is connected between the second output terminal 232 and a ground. In particular, a first terminal of the fifth switching unit 820 is connected to the third input terminal 231, and a second terminal of the fifth switching unit 820 is connected to the second output terminal 232. A first terminal of the sixth switching unit 830 is connected to the second output terminal 232, and a second terminal of the sixth switching unit 830 is connected to the ground.

When the fifth switching unit 820 and the sixth switching unit 830 are the third N channel MOSFET and the fourth N channel MOSFET, respectively, a source terminal of the third N channel MOSFET is connected to the third input terminal 231, and a drain terminal of the third N channel MOSFET is connected to the second output terminal 232. Also, a source terminal of the fourth N channel MOSFET is connected to the second output terminal 232, and a drain terminal of the fourth N channel MOSFET is connected to the ground.

A sixth input terminal 811 of the DC/DC controller 810 is connected to the DC output terminal 251. In particular, a voltage of the DC output terminal 251 is applied to the DC/DC controller 810 as an input voltage.

The DC/DC controller 810 adjusts the voltage of the DC output terminal 251 by controlling the fifth switching unit 820 and the sixth switching unit 830 via pulse width modulation (PWM).

The DC/DC controller 810 closes and opens the fifth switching unit 820 and the sixth switching unit 830 in an alternating based on an input voltage applied to the sixth input terminal 811. One of the fifth switching unit 820 and the sixth switching unit 830 is closed and the other one is opened simultaneously. In particular, the DC/DC controller 810 outputs a control signal for closing or opening the fifth switching unit 820 via the fifth output terminal 812, and outputs a control signal for closing or opening the sixth switching unit 830 via the sixth output terminal 813, to close one of the fifth switching unit 820 and the sixth switching unit 830 and open the other one of the fifth switching unit 820 and the sixth switching unit 830 simultaneously. $C_5$ denotes a control signal output from the fifth output terminal 812. $C_6$ denotes a control signal output from the sixth output terminal 813.

The fifth output terminal 812 is connected to a gate terminal of the third N channel MOSFET 820. The fifth output terminal 812 outputs the signal $C_5$ for controlling the third N channel MOSFET 820. The sixth output terminal 813 is connected to a gate terminal of the fourth N channel MOSFET 830. The sixth output terminal 813 outputs the signal $C_6$ for controlling the fourth N channel MOSFET 830.

The DC/DC controller 810 controls the closing and opening of the fifth switching unit 820, i.e., the third N channel MOSFET 820, using the signal $C_5$. The DC/DC controller 810 controls the closing and opening of the sixth switching unit 830, i.e., the fourth N channel MOSFET 830, using the signal $C_6$. For example, only one of $C_5$ and $C_6$ at a time may have a voltage value for closing a MOSFET, and the other one of $C_5$ and $C_6$ may have a voltage value for opening a MOSFET.

The DC/DC controller 810 closes the fifth switching unit 820 and the sixth switching unit 830 in an alternating manner, and converts a DC level of a rectified AC input power. For example, a DC level of the second output terminal 232 and a DC level of the DC output terminal 251 may be adjusted based on a ratio of a period of time during which the fifth switching unit 820 is closed to an entire period of time equal to a sum of the period of time during which the fifth switching unit 820 is closed and period of time during which the fifth switching unit 820 is opened.

Figure 9:
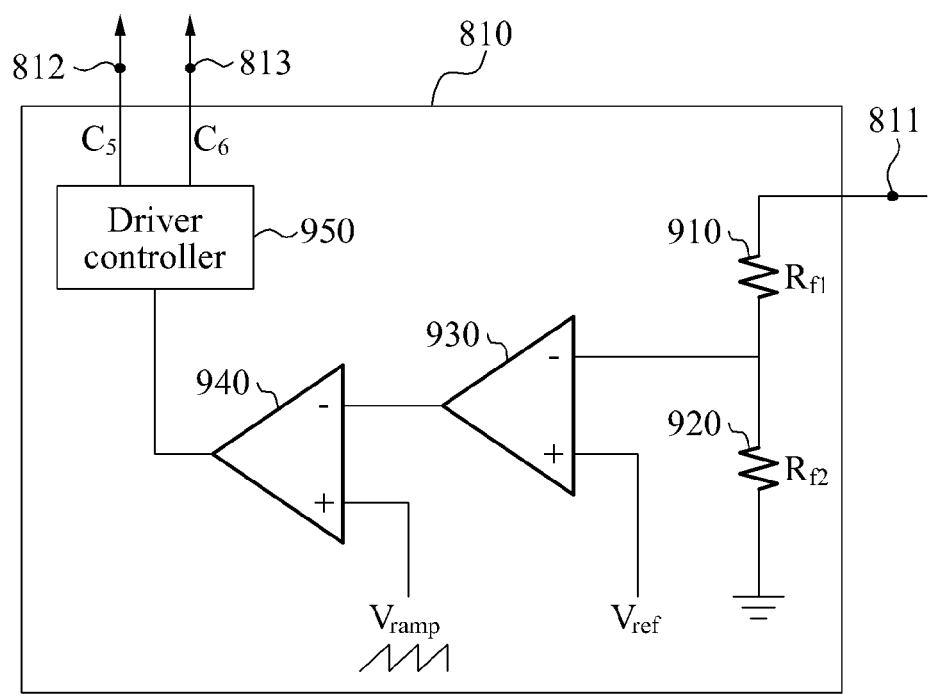
FIG. 9 illustrates an example of a DC/DC controller.

FIG. 9 illustrates an example of a DC/DC controller 810.

Referring to FIG. 9, the DC/DC controller 810 includes a first resistor 910, a second resistor 920, a third comparator 930, a fourth comparator 940, and a driver controller 950.

In FIG. 9, the first resistor 910 and the second resistor 920 denoted by $Rf_1$ and $Rf_2$, respectively.

A first terminal of the first resistor 910 is connected to the sixth input terminal 811. A second terminal of the first resistor 910, a negative terminal of the third comparator 930, and a first terminal of the second resistor 920 are connected to one another. A second terminal of the second resistor 920 is connected to a ground.

A reference voltage $V_{ref}$ is applied to a positive terminal of the third comparator 930.

An output terminal of the third comparator 930 is connected to a negative terminal of the fourth comparator 940. A voltage $V_{ramp}$ is applied to a positive terminal of the fourth comparator 940. $V_{ramp}$ denotes a ramp wave in a form of a sawtooth.

A voltage of the sixth input terminal 811 is applied to the first terminal of the first resistor 910. The voltage applied to the first terminal of the first resistor 910 is divided by the first resistor 910 and the second resistor 920 to obtain a voltage appropriate for use in the third comparator 930, and is input to a negative terminal of the third comparator 930. The voltage appropriate for use in the third comparator 930 is a voltage adjusted according to the reference voltage $V_{ref}$.

In particular, an output voltage of the DC output terminal 251 is fed back to the DC/DC controller 810, and the fed back output voltage is lowered by a voltage divider of the first resistor 910 and the second resistor 920. The lowered output voltage is compared to $V_{ref}$ in the third comparator 930, for example, an error amplifier.

The third comparator 930 outputs a control signal that is input to the negative terminal of the fourth comparator 940 based on the voltage applied to the negative terminal of the third comparator 930. For example, when a voltage less than $V_{ref}$ is applied to the negative terminal of the third comparator 930, the third comparator 930 outputs a control signal having a positive value. When a voltage greater than $V_{ref}$ is applied to the negative terminal of the third comparator 930, the third comparator 930 outputs a control signal having a negative value. The control signal output from the third comparator 930 is input to the negative terminal of the fourth comparator 940. Also, the greater a difference between $V_{ref}$ and the voltage applied to the negative terminal of the third comparator 930, the higher the voltage of the control signal output from the third comparator 930. In particular, a signal output from the third comparator 930 represents a difference between the output voltage of the DC output terminal 251 lowered by the voltage divider and the reference voltage $V_{ref}$.

The fourth comparator 940 outputs a control signal that is input to an input terminal of the driver controller based on a voltage to be applied to the negative terminal of the fourth comparator 940. For example, when a voltage less than $V_{ramp}$ is applied to the negative terminal of the fourth comparator 940, the fourth comparator 940 outputs a control signal having a positive value. When a voltage greater than $V_{ramp}$ is applied to the negative terminal of the third comparator 930, the fourth comparator 940 outputs a control signal having a negative value. The control signal output from the fourth comparator 940 is input to an input terminal of the driver controller 950.

$V_{ramp}$ denotes a voltage constantly changing in a form of a sawtooth. Accordingly, a first ratio of a period of time during which the control signal having the positive value is output from the fourth comparator 940 to an entire period of time equal to a sum of the period of time during which the control signal having the positive value is output from the fourth comparator 940 and a period of time during which the control signal having the negative value is output from the fourth comparator 940, or a second ratio of the period of time during which the control signal having the negative value is output from the fourth comparator 940 to the entire period of time, may change based on the voltage of the control signal output from the third comparator 930.

The driver controller 950 controls a value of the control signal $C_5$ output from the fifth output terminal 812 and the control signal $C_6$ output from the sixth output terminal 813 based on a voltage applied to the input terminal of the driver controller 950. For example, when the voltage applied to the input terminal of the driver controller 950 has a positive value, the driver controller 950 controls the control signal $C_5$ to have a value for closing the fifth switching unit 820, and controls the control signal $C_6$ to have a value for closing the sixth switching unit 830. When the voltage applied to the input terminal of the driver controller 950 has a negative value, the driver controller 950 controls the control signal $C_5$ to have a value for opening the fifth switching unit 820, and controls the control signal $C_6$ to have a value for closing the sixth switching unit 830. Alternatively, when the voltage applied to the input terminal of the driver controller 950 has a positive value, the driver controller 950 controls the control signal $C_5$ to have a value for opening the fifth switching unit 820, and controls the control signal $C_6$ to have a value for closing the sixth switching unit 830. When a voltage applied to the input terminal of the driver controller 950 has a negative value, the driver controller 950 controls the control signal $C_5$ to have a value for closing the fifth switching unit 820, and controls the control signal $C_6$ to have a value for opening the sixth switching unit 830.

Accordingly, the closing and the opening of the fifth switching unit 820 and the sixth switching unit 830 are controlled based on the voltage applied to the input terminal of the driver controller 950.

As described in the preceding, the first ratio of the period of time during which the control signal having the positive value is output from the fourth comparator 940 to the entire period of time, or the second ratio of the period of time during which the control signal having the negative value is output from the fourth comparator 940 to the entire period of time, may change based on the voltage of the control signal output from the third comparator 930. Accordingly, a ratio of a period of time during which the fifth switching unit 820 is closed and the sixth switching unit 830 is opened to an entire period of time may be determined based on the voltage of the control signal output from the third comparator 930. Conversely, a ratio of a period of time during which the fifth switching unit 820 is opened and the sixth switching unit 830 is closed to an entire period of time may be determined based on the voltage of the control signal output from the third comparator 930.

In particular, the lower a level of the fed back output voltage, the wider a PWM width of the control signal that is generated. Further, the higher the level of the fed back output voltage, the narrower the PWM width of the control signal that is generated.

The ratio of the period of time during which the fifth switching unit 820 and the sixth switching unit 830 are each closed or opened may be adjusted by the control signal output from the third comparator 930, and the DC level of the rectified power may be converted by the adjustment.

Figure 10:
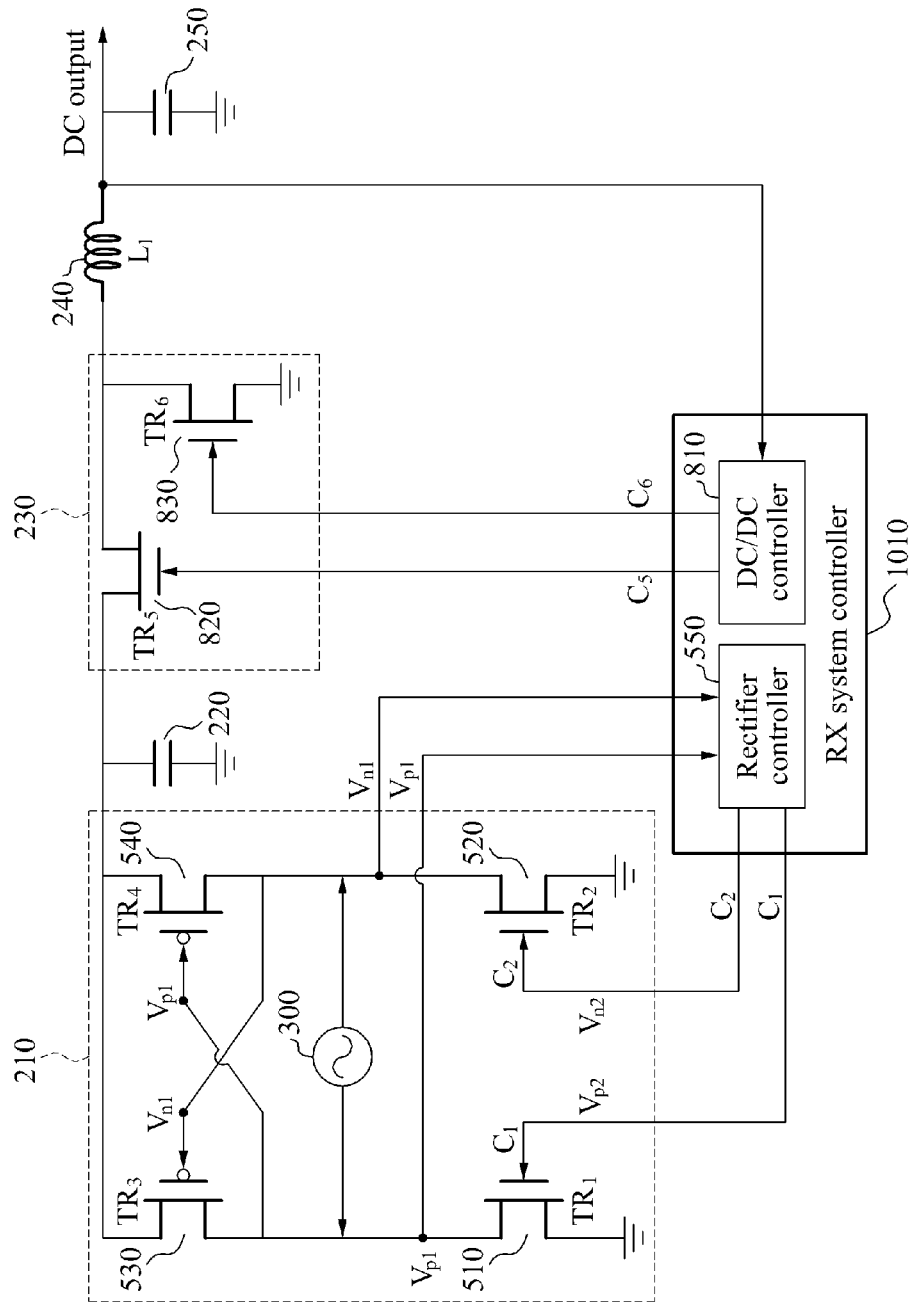
FIG. 10 illustrates an example of a reception (RX) system controller.

FIG. 10 illustrates an example of an RX system controller 1010.

Referring to FIG. 10, the RX system controller 1010 includes the rectifier controller 550 described with reference to FIGS. 5 and 6, and the DC/DC controller 810 described with reference to FIGS. 8 and 9. In particular, the rectifier controller 550 and the DC/DC controller 810 may be fabricated on a single chip separate from other components of the synchronous rectifier 210 and the DC/DC converter 230.

By way of example, the rectifier controller 550 and the DC/DC controller 810 may be fabricated by being integrated into a single on-chip integrated circuit (IC).

The RX system controller 101 may control the other components of the synchronous rectifier 210 and the DC/DC converter 230 via output signals $C_1$, $C_2$, $C_5$ and $C_6$.

The RX system controller 101 includes two output terminals for operating the synchronous rectifier 210, for example, the third output terminal 553 and the fourth output terminal 554 in FIGS. 5 and 6, two input terminals for operating the synchronous rectifier 210, for example, the fourth input terminal 551 and the fifth input terminal 552 in FIGS. 5 and 6, two output terminals for operating the DC/DC converter 230, for example, the fifth output terminal 812 and the sixth output terminal 813 in FIGS. 8 and 9, and an input terminal for operating the DC/DC converter 230, for example, the sixth input terminal 811 in FIGS. 8 and 9.

In the wireless power reception apparatus 120, when an amount of charging current increases during a state of a constant charging voltage, efficiency of the synchronous rectifier 210 and the DC/DC converter 230 may decrease, and heat generated in the synchronous rectifier 210 and the DC/DC converter 230 may increase.

Sizes of the fifth switching unit 820 and the sixth switching unit 830, for example, the third N channel MOSFET and the fourth N channel MOSFET, may increase in proportion to the amount of the charging current in order for the DC/DC converter 230 to be able to supply a high level of charging current. When a full body of the DC/DC converter 230 is implemented in an on-chip IC, a number of on-chip ICs that can be manufactured per wafer may be limited, and a manufacturing cost of the on-chip IC may rise due to such limit.

The wireless power reception apparatus 120 may be configured based on an off-chip concept. More particularly, switching units having a large size and requiring high efficiency may be implemented using off-chip discrete elements fabricated through a special process, and the rectifier controller 550 and the DC/DC controller 810 for operating or controlling the switching units may be fabricated as an on-chip IC.

Such implementation based on the off-chip concept may be more advantageous in terms of cost than an on-chip IC in which the full body of the wireless power reception apparatus 120 is implemented.

Figure 11:
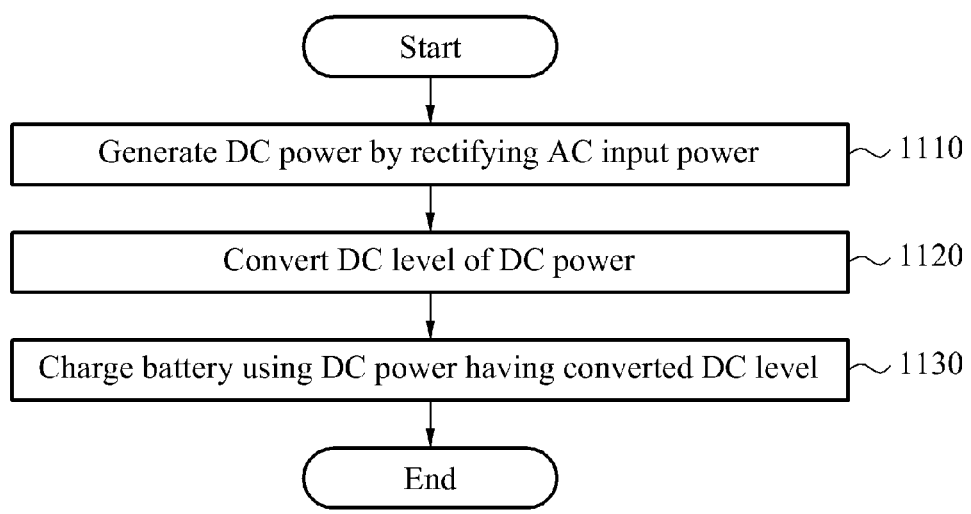
FIG. 11 illustrates an example of a method of supplying a power.

FIG. 11 illustrates an example of a method of supplying a power.

Referring to FIG. 11, in 1110, the synchronous rectifier 210 generates a DC power by rectifying an AC input power.

In 1120, the DC/DC converter 230 converts a DC level of the generated DC power.

In 1130, the load 130 charges the battery 132 using the DC power having the converted DC level.

Descriptions provided with reference to FIGS. 1 through 10 may be applied to FIG. 11, and thus repeated descriptions will be omitted here for conciseness.

The rectifier controller 550 in FIGS. 5 and 10, the first comparator 610, the first delay compensator 620, the second comparator 630, and the second delay compensator 640 in FIG. 6, the DC/DC controller 810 in FIGS. 8 and 10, the third comparator 930, the fourth comparator 940, and the driver controller 950 in FIG. 9, and the RX system controller 1010 in FIG. 10 that perform the various operations described with respect to FIGS. 1-4, 7A-7C, and 11 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A synchronous rectifier comprising:
   a first switching unit;
   a second switching unit;

a third switching unit;
a fourth switching unit;
a DC/DC converter; and
a rectifier controller configured to:
  delay, via a first control signal outputted to the first switching unit, a closing of the first switching unit until an opening of the third switching unit, and
  delay, via a second control signal outputted to the second switching unit, a closing of the second switching unit until an opening of the fourth switching unit,
wherein the synchronous rectifier is configured to rectify an alternating current (AC) input power via a first input terminal and a second input terminal,
wherein, in response to a voltage of the first input terminal being greater than a voltage of the second input terminal, the second switching unit and the third switching unit are closed, the first switching unit and the fourth switching unit are opened, and a current of the AC input power is supplied to an output terminal of the synchronous rectifier via the closed second switching unit and the closed third switching unit,
wherein, in response to the voltage of the second input terminal being greater than the voltage of the first input terminal, the first switching unit and the fourth switching unit are closed, the second switching unit and the third switching unit are opened, and a current of the AC input power is supplied to the output terminal via the closed first switching unit and the closed fourth switching unit,
a fifth switching unit connected between the third input terminal and a second output terminal of the DC/DC converter: and
a sixth switching unit connected between the second output terminal and a ground, and
wherein the DC/DC controller is configured to convert the DC level of the rectified AC input power by closing and opening the fifth switching unit and the sixth switching unit in an alternating manner so that when one of the fifth switching unit and the sixth switching unit is closed, another one of the fifth switching unit and the sixth switching unit is open.

2. The synchronous rectifier of claim 1, wherein a first terminal of the first switching unit is connected to the first input terminal, and a second terminal of the first switching unit is connected to a ground;
  a first terminal of the second switching unit is connected to the second input terminal, and a second terminal of the second switching unit is connected to the ground;
  a first terminal of the third switching unit is connected to the output terminal, and a second terminal of the third switching unit is connected to the first input terminal; and
  a first terminal of the fourth switching unit is connected to the output terminal, and a second terminal of the fourth switching unit is connected to the second input terminal.

3. The synchronous rectifier of claim 1, wherein the rectifier controller is configured to control closing and opening of the first switching unit based on the voltage of the first input terminal and the voltage of the second input terminal, and control closing and opening of the second switching unit based on the voltage of the first input terminal and the voltage of the second input terminal.

4. The synchronous rectifier of claim 3, wherein the first switching unit, the second switching unit, the third switching unit, and the fourth switching unit are fabricated by a process different from a process by which the rectifier controller is fabricated.

5. The synchronous rectifier of claim 3, wherein the rectifier controller is further configured to control the first switching unit and the second switching unit to compensate for a delay of the first switching unit and the second switching unit with respect to the third switching unit and the fourth switching unit.

6. The synchronous rectifier of claim 1, wherein the first switching unit is a first N channel metal-oxide-semiconductor field-effect transistor (MOSFET);
  the second switching unit is a second N channel MOSFET;
  the third switching unit is a first P channel MOSFET; and
  the fourth switching unit is a second P channel MOSFET.

7. The synchronous rectifier of claim 6, wherein the first P channel MOSFET and the second P channel MOSFET are cross-coupled.

8. The synchronous rectifier of claim 1, wherein the first switching unit, the second switching unit, the third switching unit, and the fourth switching unit are respective discrete power transistors.

9. An apparatus for supplying a power, the apparatus comprising:
  a synchronous rectifier configured to rectify an alternating current (AC) input power to generate a direct current (DC) power, and comprising a first switching unit, a second switching unit, a third switching unit, and a fourth switching unit, wherein the first through fourth switching units comprise discrete power transistors;
  a DC/DC converter configured to convert a DC level of the DC power; and
  an integrated circuit comprising:
    a rectifier controller comprising a first comparator and a second comparator, and configured to perform a delay compensation on a first control signal to be outputted to the first switching unit, and perform a delay compensation on a second control signal to be outputted to the second switching unit, and
    a DC/DC controller configured to convert the DC level of the rectified AC input power,
  wherein the synchronous rectifier is further configured to receive the AC input power via a first input terminal of the synchronous rectifier and a second input terminal of the synchronous rectifier,
  wherein, in response to a voltage of the first input terminal being greater than a voltage of the second input terminal, the second switching unit and the third switching unit are closed, the first switching unit and the fourth switching unit are opened, and a current of the AC input power is supplied to a first output terminal of the synchronous rectifier via the closed second switching unit and the closed third switching unit,
  wherein, in response to the voltage of the second input terminal being greater than the voltage of the first input terminal, the first switching unit and the fourth switching unit are closed, the second switching unit and the third switching unit are opened, and a current of the AC input power is supplied to the first output terminal via the closed first switching unit and the closed fourth switching unit,
  wherein the first output terminal is connected to a third input terminal of the DC/DC converter,
  a fifth switching unit connected between the third input terminal and a second output terminal of the DC/DC converter: and a sixth switching unit connected between the second output terminal and a ground, and wherein the DC/DC controller is configured to convert the DC level of the rectified AC input power by closing and opening the fifth switching unit and the sixth switching unit in an alternating manner so that when one of the fifth switching unit and the sixth switching unit is closed, another one of the fifth switching unit and the sixth switching unit is open.

10. The synchronous rectifier of claim 9, wherein the rectifier controller is configured to control closing and opening of the first switching unit based on the voltage of the first input terminal and the voltage of the second input terminal, and control closing and opening of the second switching unit based on the voltage of the first input terminal and the voltage of the second input terminal.

11. The synchronous rectifier of claim 10, wherein the first switching unit, the second switching unit, the third switching unit, and the fourth switching unit are fabricated by a process different from a process by which the rectifier controller is fabricated.

12. The synchronous rectifier of claim 10, wherein the rectifier controller is further configured to control the first switching unit and the second switching unit to compensate for a delay of the first switching unit and the second switching unit with respect to the third switching unit and the fourth switching unit.

13. The synchronous rectifier of claim 10, wherein the first switching unit is a first N channel metal-oxide-semiconductor field-effect transistor (MOSFET);

the second switching unit is a second N channel MOSFET;

the third switching unit is a first P channel MOSFET; and the fourth switching unit is a second P channel MOSFET.

14. The synchronous rectifier of claim 13, wherein the first P channel MOSFET and the second P channel MOSFET are cross-coupled.

15. The synchronous rectifier of claim 13, wherein the rectifier controller is further configured to control closing and opening of the first N channel MOSFET and the second N channel MOSFET based on the voltage of the first input terminal and the voltage of the second input terminal.

16. The synchronous rectifier of claim 10, wherein the rectifier controller and the DC/DC converter are fabricated on a single chip.

17. The synchronous rectifier of claim 9, wherein the first switching unit, the second switching unit, the third switching unit, and the fourth switching unit are respective discrete power transistors.

18. The synchronous rectifier of claim 9, wherein the DC/DC converter is a DC/DC buck converter.

19. A method of supplying a power, the method comprising:

rectifying, by a synchronous rectifier, an alternating current (AC) input power to generate a direct current (DC) power, wherein the synchronous rectifier comprises:
a first switching unit,
a second switching unit,
a third switching unit, and
a fourth switching unit;

converting, by a DC/DC converter, a DC level of the DC power;

delaying, via a first control signal outputted to the first switching unit, a closing of the first switching unit until an opening of the third switching unit; and delaying, via a second control signal outputted to the second switching unit, a closing of the second switching unit until an opening of the fourth switching unit, wherein the rectifying comprises:
receiving the AC input power via a first input terminal of the synchronous rectifier and a second input terminal of the synchronous rectifier;

in response to a voltage of the first input terminal being greater than a voltage of the second input terminal, closing the second switching unit and the third switching unit, opening the first switching unit and the fourth switching unit, supplying a current of the AC input power to a first output terminal of the synchronous rectifier via the closed second switching unit and the closed third switching unit;

in response to the voltage of the second input terminal being greater than the voltage of the first input terminal, closing the first switching unit and the fourth switching unit, opening the second switching unit and the third switching unit, and supplying a current of the AC input power is supplied to the first output terminal via the closed first switching unit and the closed fourth switching unit, wherein the first output terminal is connected to a third input terminal of the DC/DC converter, a fifth switching unit connected between the third input terminal and a second output terminal of the DC/DC converter; and a sixth switching unit connected between the second output terminal and a ground, and wherein the DC/DC controller is configured to convert the DC level of the rectified AC input power by closing and opening the fifth switching unit and the sixth switching unit in an alternating manner so that when one of the fifth switching unit and the sixth switching unit is closed, another one of the fifth switching unit and the sixth switching unit is open.

20. An apparatus for supplying a power, the apparatus comprising:

a synchronous rectifier comprising first through fourth switching elements;

a DC/DC converter comprising other switching elements, wherein the switching elements of the DC/DC converter comprise discrete power transistors; and an integrated circuit comprising:
a rectifier controller comprising a first comparator and a second comparator, and configured to control the switching elements of the synchronous rectifier in an alternating manner, via delay-compensated control signals, to rectify an alternating current (AC) power to generate a direct current (DC) power, and a DC/DC controller configured to control the switching elements of the DC/DC converter in an alternating manner to adjust a DC level of the DC power generated by the synchronous rectifier and output the DC power having the adjusted DC level, wherein the rectifier controller and the DC/DC controller are fabricated together on a single chip, and wherein the switching elements of the synchronous rectifier and the switching elements of the DC/DC converter are fabricated as discrete off-chip switching elements, wherein the DC/DC converter comprises:

a fifth switching unit connected between the third input terminal and a second output terminal of the DC/DC converter: and a sixth switching unit connected between the second output terminal and a ground, and wherein the DC/DC controller is configured to convert the DC level of the rectified AC input power by closing and opening the fifth switching unit and the sixth switching unit in an alternating manner so that when one of the fifth switching unit and the sixth switching unit is closed, another one of the fifth switching unit and the sixth switching unit is open.

21. The apparatus of claim 20, wherein the DC/DC controller is further configured to control the switching elements of the DC/DC converter in an alternating manner to pulse-width modulate the DC power to adjust the level of the DC power.

22. The apparatus of claim 20, further comprising:
a resonator configured to receive wireless AC power and supply the received wireless AC power to the synchronous rectifier; and
a charging circuit configured to charge a battery with the DC power having the converted DC level.

* * * * *